Aug. 5, 1969     P. J. WEAVER     3,459,402
TRACER VALVE ASSEMBLY
Filed April 21, 1967     6 Sheets-Sheet 1
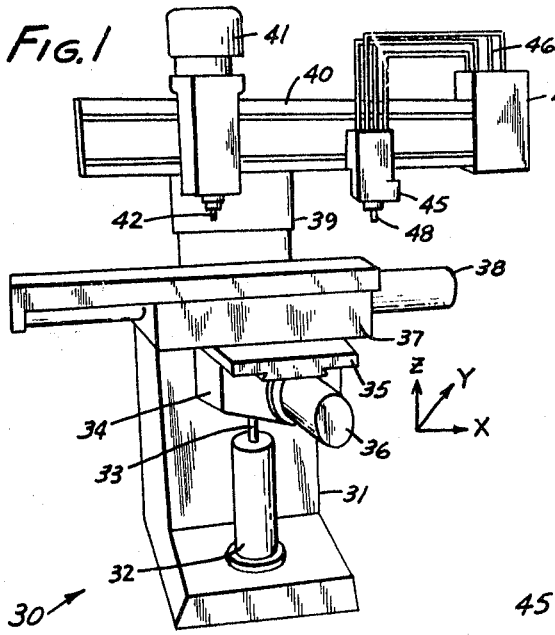
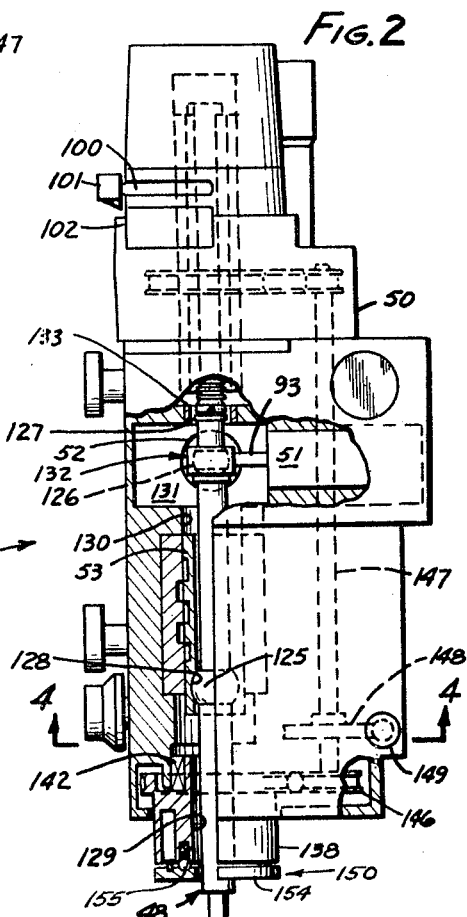
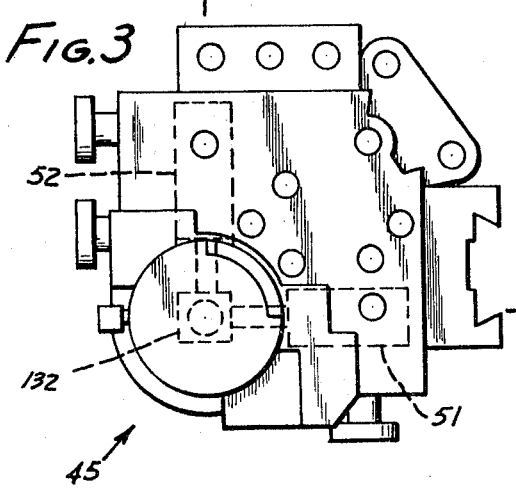
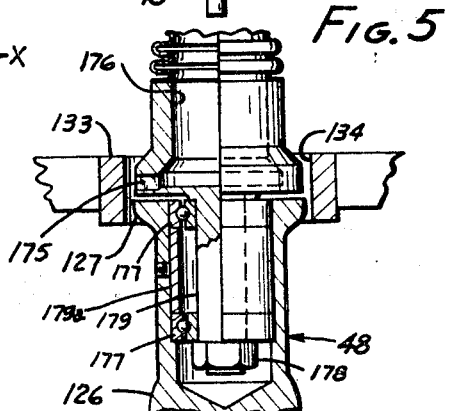
INVENTOR.
PAUL J. WEAVER
BY
*Angus & Mow*
ATTORNEYS.

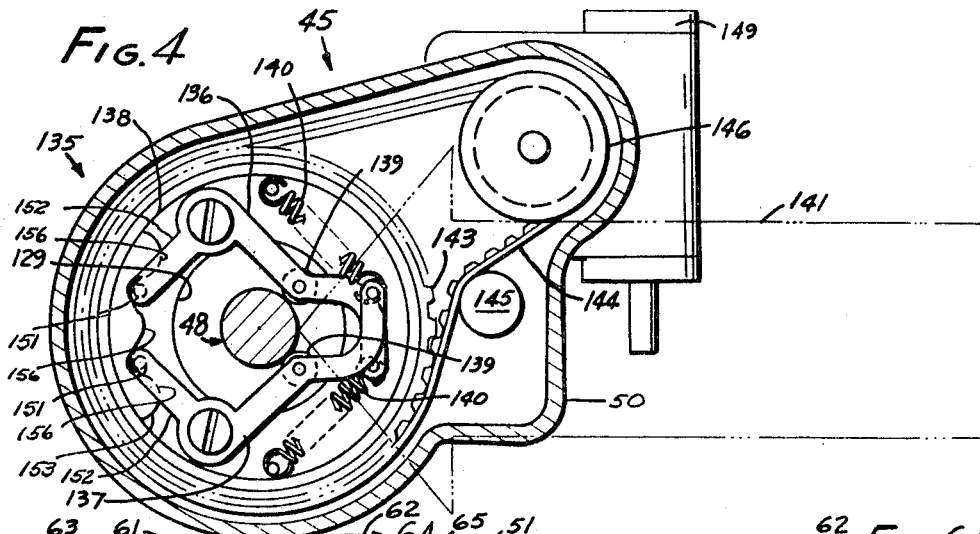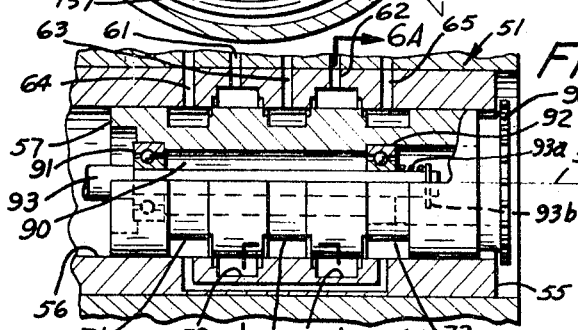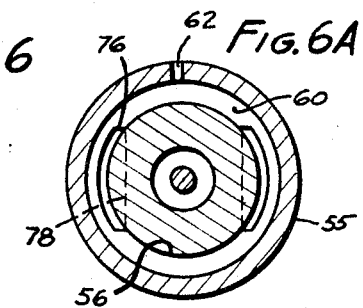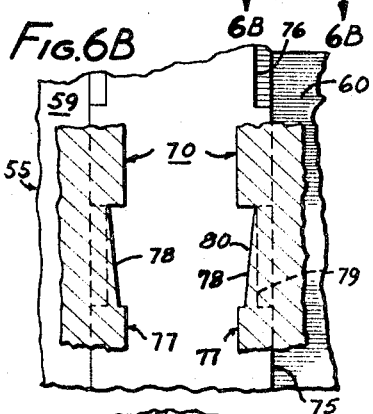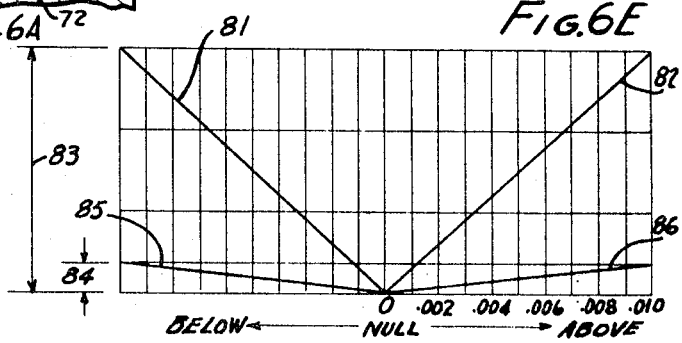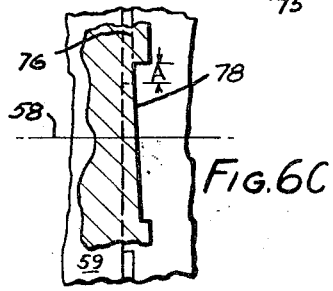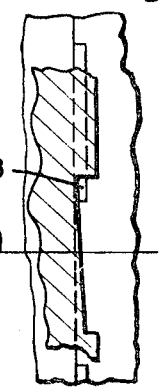

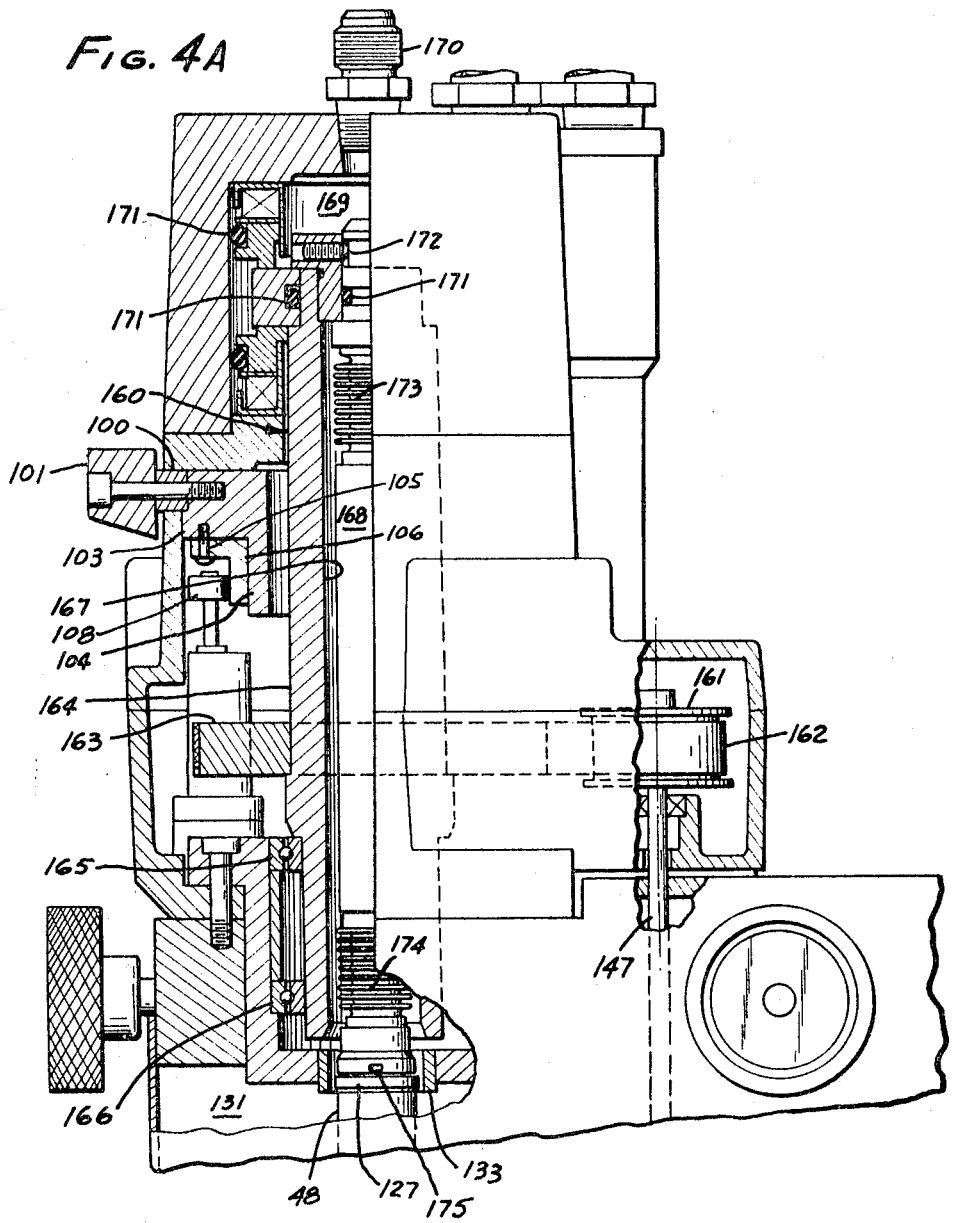

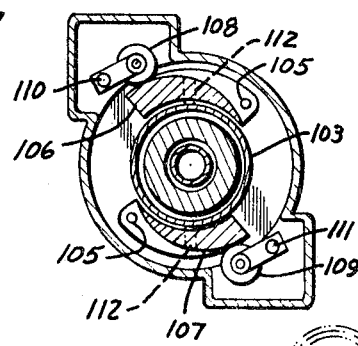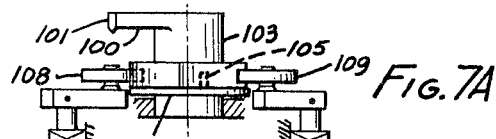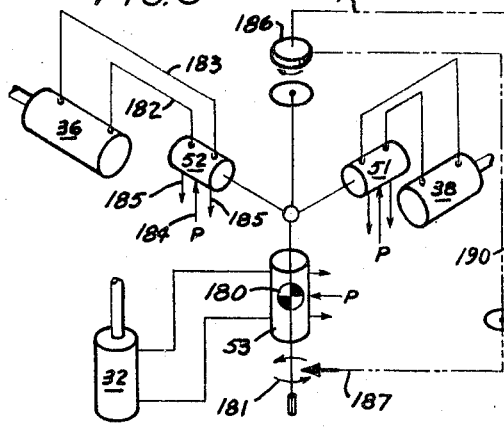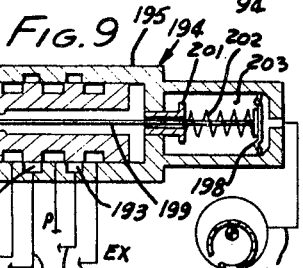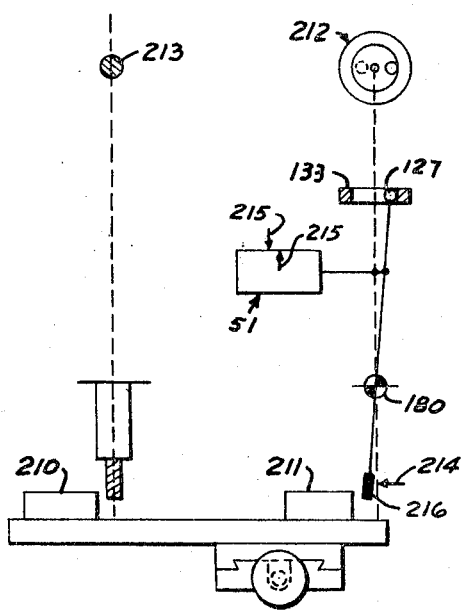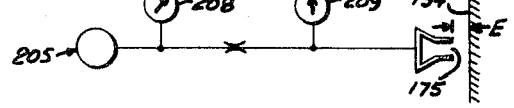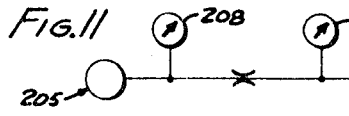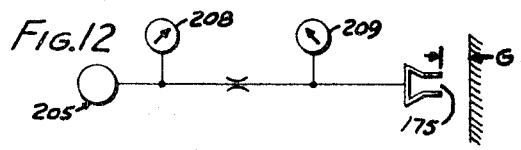
INVENTOR.
PAUL J. WEAVER
BY
ATTORNEYS.

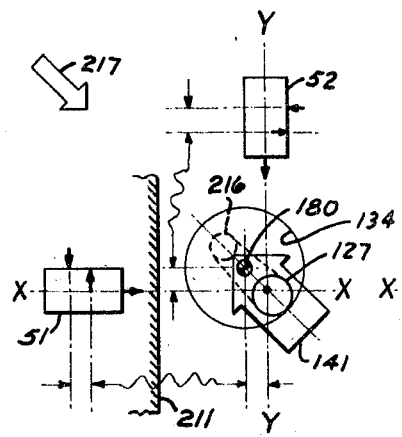
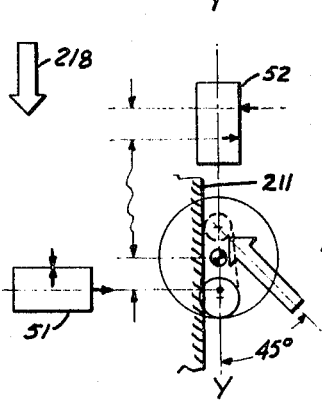
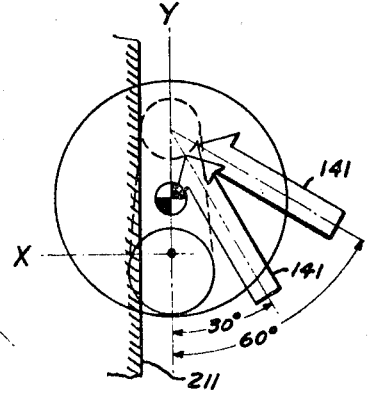
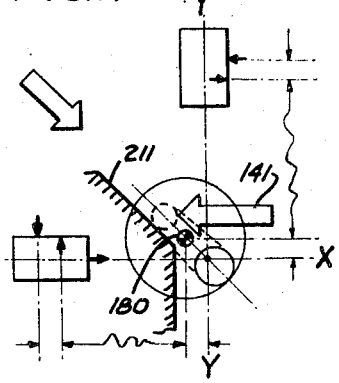
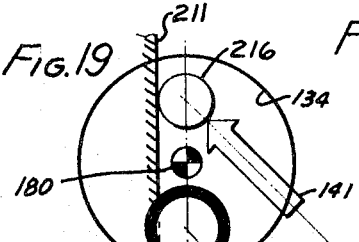
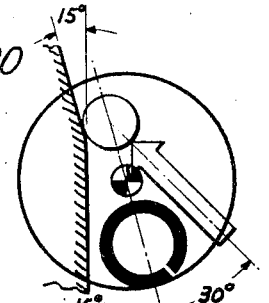
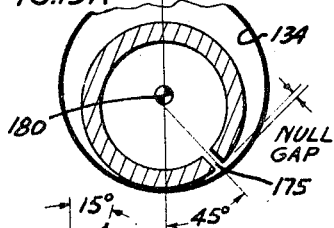
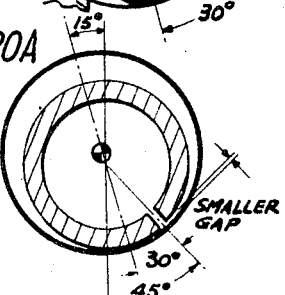
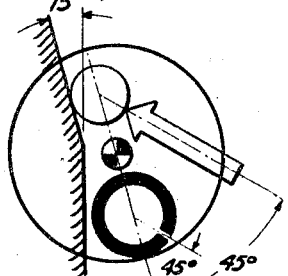
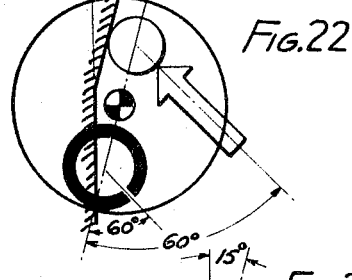
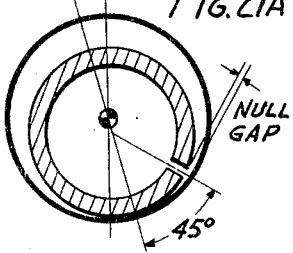
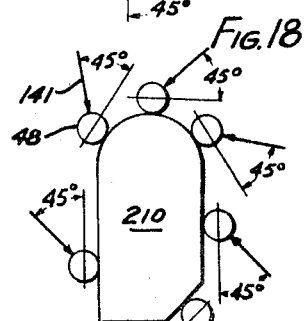
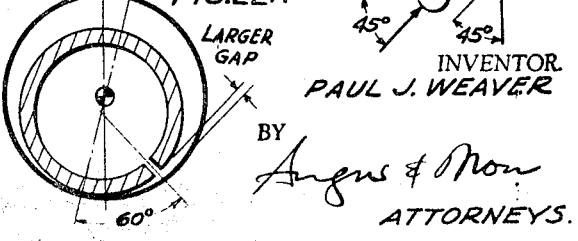

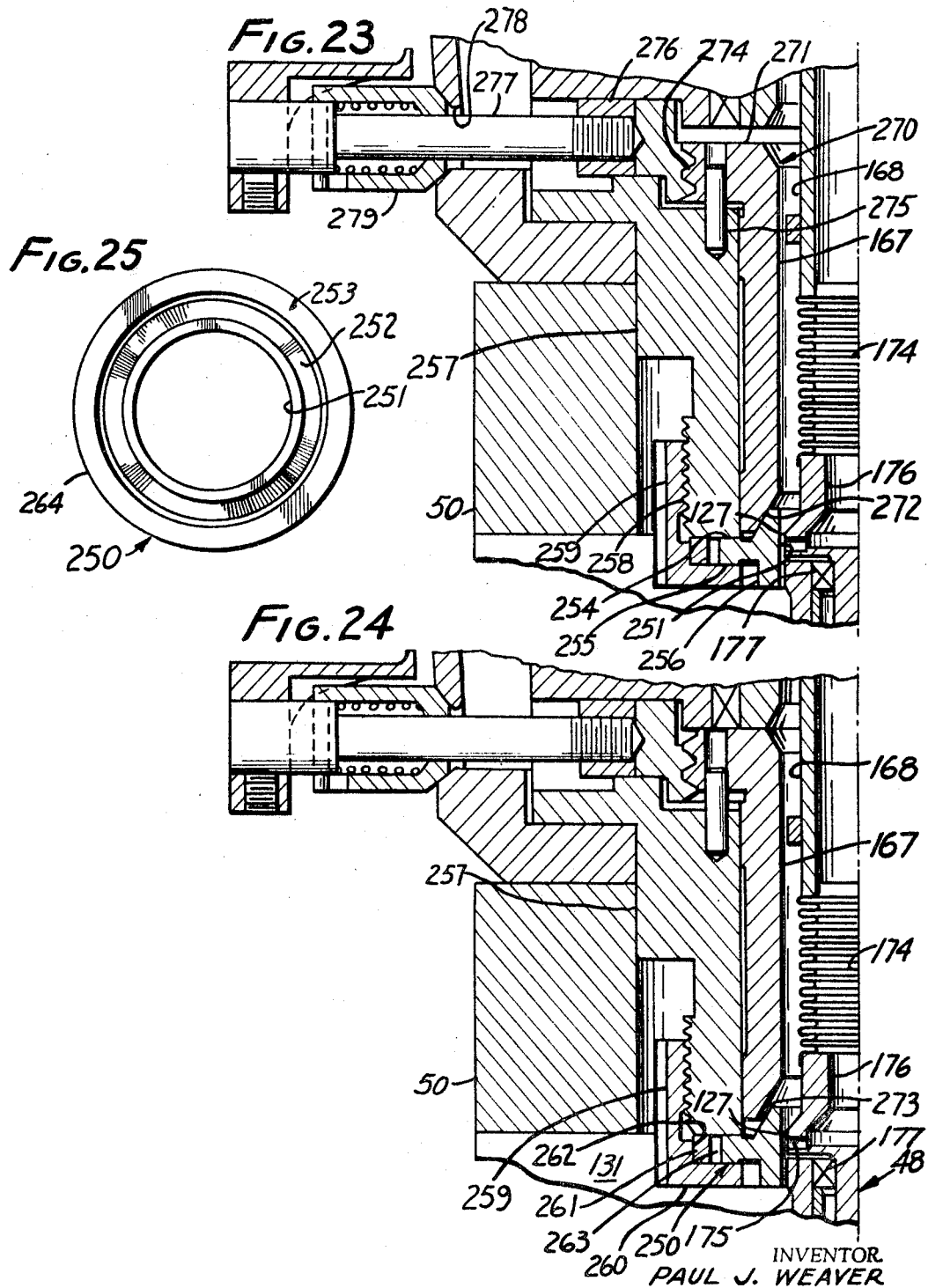

United States Patent Office 3,459,402
Patented Aug. 5, 1969

3,459,402
TRACER VALVE ASSEMBLY
Paul J. Weaver, Pasadena, Calif., assignor to True-Trace Corporation, El Monte, Calif., a corporation of Connecticut
Continuation-in-part of application Ser. No. 412,114, Nov. 18, 1964. This application Apr. 21, 1967, Ser. No. 634,049
Int. Cl. B23q 35/16
U.S. Cl. 251—3      22 Claims

ABSTRACT OF THE DISCLOSURE

This invention relates to tracer-controlled machine tools, and to a multiple-mode tracer valve capable of manual operation in three dimensions, and of optional manual or automatic operation in two dimensions and incorporating means to control simultaneously the feed rate of certain of the valve elements independently of the stylus deflection.

Cross-reference to related application

This application is a continuation-in-part of applicant's co-pending application Ser. No. 412,114 filed Nov. 18, 1964, entitled "Tracer Valve Assembly," which co-pending application is assigned to the same assignee as the instant application and now abandoned.

This invention relates to tracer-controlled machine tools and to controls for such tools.

It is common practice to control machine tools by means of systems in which control elements such as tracer valves function as servo mechanisms responsive to the action of a stylus which traces around or over a template or a pattern (these terms being used interchangeably herein to denote a body, all or a portion of whose shape is to be duplicated in a workpiece). The output of the control elements powers actuators, which in turn cause geometrically similar relative movements between a cutting tool and a workpiece, thereby reproducing the shape of the template or pattern in the workpiece. Such tracing is customarily done along one, two, three, or even more axes. It is an object of this invention to provide a tracer control which enables machining to be accomplished manually in three axes, or either manually or automatically in two axes. The first said mode of operation is sometimes called "3D" or "three axis" operation, and the latter is sometimes called "360" or "two axis" operation.

Tracer valves for two and three-axis control are generally known from Rosebrook Patents Nos. 2,753,145 and 2,835,466, issued July 3, 1956, and May 20, 1958, respectively. Automatic controls for 360° machining are generally known from Rosebrook Patents Nos. 2,909,357 and 3,006,595, issued Oct. 20, 1959, and Oct. 31, 1961 respectively.

Experience has indicated that there are certain refinements to the prior art mechanisms which would serve to make automatic 360 control more compatible with a 3D device, thereby to make the device even more suitable for industrial use. One problem which is often encountered is that of limiting the maximum flow through control valves, and coordinating the flow between a plurality of them. Heretofore, the most common means of controlling the feed rate in tracer valves has been either to meter the flow of fluid through the motor lines, which flow has already been modulated by the tracer valve, thereby exerting a double and often undesirable additional influence on the flow pattern of the system, or by limiting the amount of deflection of the stylus and thereby limiting the amount by which the valve can be opened.

Both of the foregoing techniques find successful use in many applications, but in many jobs requiring close tolerances and superior surface finish or operation at low feed rates, difficulties are encountered. In the device where feed rate is limited by secondary metering exerted downstream from the tracer valve, the tracer signal may become so small a function compared to the other pressure drops as essentially to lose its control identity. In the other technique, that of limiting the stylus deflection, the openings in the tracer valve may be so small as to silt up or to encounter other flow effects which sometimes occur in very small orifices.

Another problem inhereent in the automatic control of a tracer-controlled machine tool and automatic tracing is the need to keep the speed of cutter movement substantially constant regardless of the direction of motion. This invention solves that problem.

A problem which arises in tracer valves under prior art automatic control is that the feed rates established by them are at least partially determined by the maximum lateral displacement of a stylus. This is especially the case in that class of device where the sensing which causes the stylus to seek the pattern is a function of the clearance at an orifice which is associated with the stylus. An optional objective of this invention is to provide means to enlarge the feed control range within a tracer valve.

It is an object of this invention to provide an automatic tracer valve in which the feed rate is substantially identical in all directions of automatic feed, in which the flow rate control for the 360 automatic feed can be adjusted by unique means which free the device from the problems of small orifice effects, and in which the relative flow rates between pluralities of spools may readily be adjusted so as to coordinate their effects.

It is a further object of this invention to provide the above advantages in a single housing, wherein the device is readily adapted to be used in any of the tracing modes heretofore referred to, and which is readily adapted to be mounted to existing machine tools such as mills.

The above and other features of this invention will be fully understood from the following detailed description and the accompanying drawings in which:

FIG. 1 is a perspective view of a conventional milling machine equipped with the invention;

FIG. 2 is a side elevation, partly in cutaway cross-section, of the presently preferred embodiment of tracer valve according to this invention;

FIG. 3 is a top view of FIG. 2;

FIG. 4 is a cross-section taken at line 4—4 of FIG. 2;

FIG. 4A is an enlarged elevation, partly in cross-section, of the upper portion of FIG. 2;

FIG. 5 is a fragmentary view of another portion of FIG. 2;

FIG. 6 is an enlarged cross-section of still another portion of FIG. 2;

FIG. 6A is a cross-section taken at line 6A—6A of FIG. 6;

FIG. 6B is a developed cross-section taken at line 6B—6B of FIG. 6;

FIGS. 6C and 6D are fragmentary developed views showing flow relationships between portions of FIG. 6;

FIG. 6E is a chart showing some flow characteristic of the valve of FIG. 6;

FIG. 7 is a fragmentary cross-section of FIG. 2 taken at line 7—7 thereof;

FIG. 7A is an assembly view of a portion of FIG. 2;

FIG. 8 is a schematic illustration of the operation of the machine of FIG. 1;

FIG. 9 is a schematic illustration of still another portion of the invention;

FIGS. 10–12 are schematic illustrations of a control system utilized in the invention;

FIG. 13 is a fragmentary schematic illustration of portions of the machine of FIG. 1, illustrating some of the theory of its operation;

FIGS. 14–17 illustrate the theory of automatic operation of the device of FIG. 2;

FIG. 18 illustrates the effect of a portion of FIG. 2 in the automatic operation of the device;

FIGS. 19, 19A, 20, 20A, 21, 21A, 22 and 22A show the operation of a portion of FIG. 2 to accomplish a portion of the control function;

FIGS. 23 and 24 are fragmentary axial cross-sections of modifications of the invention; and FIG. 25 is a top view of a portion of FIGS. 23 and 24.

The presently preferred embodiment of the invention is shown in FIG. 1 installed on a conventional milling machine 30. While the device is shown in use as a milling machine control, it will be understood that it is basically intended for the control of any relative motions along one, two or three axes and is not limited to milling applications alone, although this is presently its principal application.

Milling machine 30 includes a pedestal 31, which is related to X, Y and Z axes, these being right-left, in-out, and up-down on this machine. An Z axis motor 32 is a piston-cylinder type, which includes a piston rod 33. The rod supports and powers a knee 34 for vertical movement along the Z axis. The knee in turn supports a cross slide 35 which is movable along the Y axis and is powered by a Y axis motor 36 comprising a piston-cylinder combination. Atop the cross slide there is a table 37 which is movable along the X axis, and is powered by an X axis motor 38, also a piston-cylinder device. The X and Y axis motors may be rotary types which power a screw, if preferred, it being one of the functions of this invention to supply metered fluid under pressure to these motors in order to cause a desired amount of relative motion along the respective axes. Suffice it to say that table 37 may be moved in three degrees of freedom along the three axes under the selective control of the respective ones of the motors.

A head frame 39 supports an arm 40 to which there is attached a milling head 41 with a rotary cutting tool 42. The arm also supports a tracer valve assembly 45 according to this invention from which hydraulic lines 46 are directed to a manifold box 47 and thence to a source of power and to the three motors. The above-described arrangement is conventional and will be recognized by persons familiar with the art.

In the machining of workpieces, it is conventional practice to place a template and a workpiece atop table 37 in a definite spaced-apart relationship substantially equal to the spacing-apart of stylus 48 of the tracer valve assembly and the cutting tool, and then to cause relative motion under the control of the tracer valve between the valve and the template, which motion is duplicated between the workpiece and the cutting tool. Then the contour of the template or pattern will be reproduced in the workpiece. Should only the 360 mode of operation be desired, the knee is locked at an appropriate elevation, and only the X and Y motors are operated under the control of the tracer valve. When the 3D mode of tracing is to be accomplished, then all three motors operate under the active control of the tracer valve. Examples of the 360 and 3D modes of operation are further described in the aforementioned Rosebrook patents.

A function of the instant device is to provide manual 3D control, or automatic or manual 360 control. To this end the tracer valve assembly includes a body 50 (see FIGS. 2 and 3) in which there is provided an X axis tracer valve 51, a Y axis tracer valve 52, and an Z axis tracer valve 53. These valves lie at right angles to each other and are parallel to the respective axes. They are provided with ports and passages which are interconnected in the same manner as that shown in the aforementioned Rosebrook Patent No. 2,835,466. Only X axis valve 51 is shown and described in detail (see FIG. 6). Y axis valve 52 is identical to it, and with certain minor changes, Z axis tracer valve 53 is also identical to it. The pertinent features of valve 51 are fully disclosed in Paul J. Weaver Patent No. 3,055,393 issued Sept. 25, 1962, to which further reference may be had for a more exhaustive description, if one is desired.

Valve 51 includes a sleeve 55 having a cylindrical spool passage 56 within which a generally cylindrical spool 57 is both rotatably and axially movably mounted in fluid sealing relationship with the wall of passage 56. The spool and the spool passage are coaxial along an axis 58, and this axis is parallel to the respective X, Y or Z axis.

The sleeve is provided with a pair of motor supply grooves 59, 60 connected by motor supply passages 61, 62, respectively, to opposite sides of X axis motor 38. Also, the sleeve is pierced by a pressure supply passage 63 and a pair of exhaust passages 64, 65, which open onto the inside surface of the cylindrical spool passage 56.

The spool has a peripheral pressure groove 70 and a pair of exhaust grooves 71, 72, the exhaust grooves being spaced from and on opposite sides of the pressure groove from each other.

The general operation of four-way valves of this type is more fully described in the aforementioned Rosebrook patents. The spool, when in the null position shown in FIG. 6, cuts off flow from the pressure supply passage and pressure groove 70 to either of the motor supply grooves, and the system is in equilibrium. No fluid is sent to the motor. Axial motion of the spool in either direction from the null condition will cause the pressure groove 70 to overlap one or the other of motor supply grooves 59, 60 and cause one or the other of exhaust grooves, 71, 72 to overlap the other of the motor supply grooves so as to create a powered circuit through the valve, the amount of power transmitted being a function of the distance by which the spool has been moved from null, thereby creating an opening of variable size for passage of fluid under pressure past the overlapping edges of the pressure groove and one motor supply groove, and past the overlapping edges of the other motor supply groove and a respective exhaust groove.

The aforementioned Rosebrook patents show the grooves formed as continuous circular edges which lie normal to the central axis of the valve. Therefore, changing the rotary position of those spools (or of the Z axis spool in this device) will have no effect on the flow pattern through the spool. In contrast, this specification and the aforementioned Weaver patent show an alteration to the edges of the grooves which can render the flow through the spool a function of both the aforesaid axial displacement and of the rotational position of the spool in the sleeve. Accordingly, recesses, which will for convenience be called notches, are formed on various of the edges of the grooves on the X and Y axis valves, that is, the valves which may be used in automatic control operation. For example (and these will be considered illustrative of all of the notches as well as their notations) edge 75 of motor supply groove 60 is modified with a notch 76, and edge 77 of pressure groove 70 is modified by a notch 78. These notches extend axially away from their respective grooves and toward the other notch. A plurality of these notches will ordinarily be formed around the edge, as shown in FIG. 6A. When the notches are rotationally aligned, then a maximum flow can occur when they overlap axially. With an identical axial displacement, the flow rate can be reduced by turning the spool in either direction from the position of direct alignment.

In FIGS. 6A, 6B and 6C, the wall of the spool passage has been laid out flat, and shown in unhatched line. Motor supply groove 60 is shown at its left edge. The spool is also laid out flat as an overlap, its groove and notch being shown in hatched line. The portion denoted by area 60 is the edge of groove 70 and a contiguous notch on the sleeve, and the area shown in hatched line and denoted by 70 is the boundary of a groove and contiguous notch 78 on the spool. Notches 76 and 78 are shown rotationally aligned in FIG. 6A. It will be seen that their immediately contiguous edges 79, 80 are angularly related, edge 79 lying normal to the central axis, and edge 80 being optionally canted slightly thereto which tends to give a slightly easier and more gradual opening of the valve. Axial motion of the notches toward each other will give maximum flow through a maximum "window." It will be seen from FIG. 6C that if the spool is rotationally displaced from the position of FIGS. 6A and 6B, then less of the notches will come into alignment, in fact only that portion bounded by the arrows denoted "A" will come into alignment after the notch edges overlap in FIG. 6C. The valve is shown shut off in FIG. 6C with a lesser potential overlap or "window" B being shown in FIG. 6D where both rotational and axial displacement from the condition of FIG. 6B to that of 6D has occurred. It will now readily be recognized that, keeping the same axial displacement between the spool and the sleeve, the flow can be increased by rotating the spool in the sleeve, which would move the hatched portion upward in FIG. 6D relative to the unhatched portion, thereby increasing the size of the flow port "B." This is the theory of rate control utilized in this device, which frees the flow rate control from sole dependence on stylus deflection. 6E illustrates the flow characteristics of the valve of FIG. 6 wherein lines 81, 82 represent the flow rate of the valve when in the condition of FIG. 6B, the displacement of the valve being referred to above and below null, and ordinate 83 indicating the maximum flow rate attainable. On the other hand, ordinate 84 illustrates the condition obtained when the valve is in the rotational position shown in FIGS. 6C and 6D, the flow characteristics then being denoted by lines 85 and 86. The abscissa is graduated in arbitrary units of axial spool displacement, and the ordinate in gallons per minute. There is obviously a family of lines radiating from null in intermediate positions corresponding to other rotational alignments in which intermediate flow rates are caused by identical axial spool displacements.

In order to make the rotational adjustment, a bore 90 is formed through the spool in which are seated bearings 91, 92. The inner race of the bearings supports a tie rod 93, through a loading spring 93a and an opposed collar 93b. The outer race supports the spool. Relative rotation is possible between the spool and both the tie rod and the sleeve. A spline gear 94 is formed on the outer end of valve 51.

Z axis tracer valve 53 differs from the valve of FIG. 6 only in the elimination of the notches. The control of maximum rate by rotational position of the spool is not provided on the Z axis. Apart from that, the internal grooving ports and connections for the Z axis tracer valve 53 relative to the Z axis motor 34 is identical to that of the X axis valve and its respective motor. All of the tracer valves are four-way valves capable of providing a null condition in which there is no flow, and reversible power connections to respective ones of the motor supply grooves for powering the respective motors.

The means for angularly rotating the spools of tracer valves 51 and 52 in their respective sleeves will now be described. A handle 100 is shown in FIG. 2 projecting beyond the periphery of body 50 and having a pointer 101 overhanging a scale 102. This handle and the pointer also appear in FIGS. 4A, 7 and 7A. As shown in FIGS. 4A and 7A, the handle extends outwardly from a ring shaft 103 which is journaled for rotation inside the body around the axis of tracer valve 53. The ring shaft includes a flange 104 to which there are pivotally attached by pins 105, a pair of cams 106, 107, which have an outer periphery followed by a pair of followers 108, 109 which are joined by arms to respective shafts 110, 111. The followers are spring-biased against the cams. Adjustment screws 112 move portions of the cam surfaces toward or away from the axis to provide for the adjustment of the cams around pins 105. This enables shafts 110 and 111 to be rotationally adjusted relative to each other. Shafts 110 and 111 are journaled to the body and extend downward to respective sets of pinion gears 113, 114, which in turn drive shafts 115, 116, that in turn drive sector gears 117, 118, which engage the spline gears 94. The sector gears and spline gears have spur teeth extending parallel to the axis of the respective tracer valve so that there can be relative axial sliding between them. Therefore, by turning the handle, the sector gears are rotated relative to the sleeve and by initial adjustment of the cams, the rates at which they turn can also be synchronized. Also, an initial adjustment of the spool and the spline gear is possible by loosening the tie rods and selecting particular teeth of the spline gears and sector gears to be engaged. Therefore, by this means it is possible to adjust the feed rate of the X and Y axis tracer valves simultaneously at any time, whether the machine is running or not, and their rotational adjustments are tied together through the handle and ring shaft 103.

The aforementioned rate control mechanism enables the machine to be run over a wide variety of tracing rates independently of stylus deflection. It will be understood that it is also possible to utilize the stylus deflection as the ultimate limitation on rate, if desired, but this foregoes some of the advantages of the device. This would be accomplished by eliminating the notches, or by leaving them fully aligned, and then limiting the stylus deflection to establish the maximum feed rate.

In FIG. 2, stylus 48 is shown mounted in the same manner as in the aforesaid U.S. Patent No. 2,835,466. Along its length, the stylus includes three spaced-apart ball-like members 125, 126, 127. Member 125 is mounted in a socket 128 inside the spool of the Z axis tracer valve. The stylus projects through a passage 129 below tracer valve 53 and upwardly through another passage 130 in the spool itself into chamber 131. Within chamber 131, there is located a yoke 132 which ties the X and Y axis tracer valves to the stylus. This yoke is the same as that shown in Rosebrook Patent No. 2,835,466. This yoke includes an inner block which embraces ball-like member 126 and a pair of inverted orthogonally related U-shaped members which are relatively slidable along the rectangular block to which the tie rods 93 are attached so that the components of motion of ball-like member 126 in the X and Y axes are transmitted to the tie rods and thus to their respective spools. The stylus is universally tiltably mounted around ball-like member 125. Ball-like member 127 is shown in greater detail in FIG. 5. It is located inside a rate ring 133 which has a cylindrical inner surface 134. Ball-like member 127 is round and is adapted to strike surface 134 to limit the maximum extent by which the stylus can be tilted. The diameter of surface 134 is selectible for the desired extent of this maximum movement, and the rate ring is firmly mounted in the body of the valve.

It will now be seen that the stylus is vertically movable. When forced upwardly, it carries the spool of the Z axis tracer valve with it. It is adapted to tilt so as to move the X and Y spools along their respective axes. This provision alone enables the device to operate as a 3D tracer valve as in the device shown in Patent 2,835,466.

Operation in the 360 mode instead of 3D is secured simply by turning off the lines to and from the Z axis tracer valve and using only the X and Y axis tracer valves. It is unnecessary to disable the stylus from vertical movement. When the device is to be operated in an automatic mode, then it is necessary to provide for a means to exert a bias force against the tip of the stylus so that it will seek the template. This is accomplished by bias force means 135 (see FIG. 4). This means straddles the stylus and includes a pair of scissor arms 136, 137, which are pivotally mounted to a rotatable bias mount 138. The bias mount includes passage 129. The scissor arms each carries a bearing 139. They are drawn toward each other and the bearings are pressed against the stylus by springs 140. It will be seen from FIG. 4 that a resultant force is exerted on the stylus in the direction of the large arrow 141, tending to bias the stylus to the left in FIG. 4. If the bias mount is rotated, and it is rotatably mounted by a bearing 142 (FIG. 2), then the direction in which the resultant bias force is applied to the stylus is also changed, and it will change the relative direction of motion between the stylus and the template. Essentially, this bias force means takes the place of the hand of the operator in automatic operation, and it is the function of the automatic device to cause the bias force means to apply the bias force in a direction which will cause the stylus to seek out and trace along the template.

As best shown in FIG. 4, the bias mount includes a gear 143 on the external surface which is engaged by a toothed belt 144 which wraps around it, passes over an idler 145, and is engaged to a drive gear 146. The drive gear is reversibly rotatable so as reversibly to drive the drive mount and thereby shift the direction of bias around the periphery of the stylus. As can best be seen in FIGS. 2 and 4A, drive gear 146 is pinned to a transmission shaft 147 that carries a worm gear 148, this worm gear being driven by a worm 149. Driving of the worm 149 drives the bias force means.

Disengagement means 150 is shown in FIGS. 2 and 4 which includes pins 151 at the tips of segments 152 of scissor arms 136, 137. These pins follow the surface of a double-kidney cam 153 which is mounted to a cam plate 154. This cam plate is rotatable relative to bias mount 138 and is normally rotationally bound to it by a ball detent 155 in the position shown in FIGS. 2 and 4. At this position, the scissor arms are free to be brought against and bias the stylus off center, because there is a clearance between the cam and pins 151. However, when the cam plate is turned either way (such as by grasping its surface and holding it while mount 138 turns, or by turning it while mount 138 holds still) two of the three lobes 156 will strike pins 151 and move bearings 139 out of contact with the stylus. This disables the automatic control and makes the valve a manually controlled valve.

Sensing means 160 (FIG. 4A) is also connected to the transmission shaft via a gear 161 that is pinned to transmission shaft 147, and through a toothed belt 162 and a gear 163. Gear 163 is non-rotatably mounted to a sleeve 164 which is journaled in the body by bearings 165, 166. The sleeve includes a sleeve passage 167 which accommodates a signal tube 168. This signal tube opens at an air chamber 169 near the top of the body to which there is connected a nipple 170 for entry of signal air. Seals 171 provide a fluid seal for chamber 169 so that the only egress of fluid is through the signal tube. The signal tube is rigidly mounted to the upper end of the sleeve and is rigidly held in place there by a set screw 172. This tube is hollow and includes a pair of bellows sections 173, 174. At the lower end and within the rate ring, there is formed a signal orifice 175 which bleeds from the internal passage 176 (FIG. 5) of the signal tube into the space between the outside of the signal tube and the cylindrical surface 134 in the rate ring.

The lower end of signal tube 168 is joined to the upper end of the stylus (FIG. 5). Bearings 177 join the two structures, and a nut 178 and spindle 179 compress the stack of bearings and a sleeve 179a. Thus the signal tube can rotate relative to the non-rotatable stylus, but its lower end tilts and moves up and down with the upper end of the stylus.

The bellows sections enable portions of the tube to flex to accommodate the lateral motions of the upper end of the stylus at ball-like member 127 and also accommodates the up and down movement of the stylus. Fluid exhausted through the signal orifice exhausts into chamber 131 from which it bleeds into atmosphere. Signal tube 168 is rotated by sleeve 164 by action of the transmission shaft 147, so that the bias force means and the signal orifice are rotated in precise synchronism. Therefore, the position of the signal orifice can be used as a sensing device to determine what should be done with the bias force means, and this is the data from which the device operates automatically. A better understanding of the automatic actuation of this device can be understood by reference to FIG. 8 in which the three tracer valves and their respective motors are shown together with a pivot notation 180 which corresponds to the ball-like member 125. This pivot point notation will be repeated in others of the schematic notations.

The action of the bias force means is indicated by arrows 181. Motor supply lines are indicated by lines 182, 13. Pressure lines into the tracer valves are indicated by lines 184, and exhaust from the tracer valves indicated by lines 185. Notation 186 indicates the lower end of the signal tube which carries the signal oriffice. Notation 187 indicates the mechanical connection between the bias force means and the signal tube. Motor 188 is shown connected reversibly to drive the transmission shaft.

Bias drive motor 188 is a reversible fluid-drive motor with a pair of supply lines 190, 191, which connect to the motor supply grooves 192, 193, respectively, of a selector valve 194 (FIG. 9) which has the same grooves as the Z axis tracer valve. It is a typical four-way valve shown in its nulls position, which can select the pressure or exhaust connections for its respective supply lines. This valve includes a sleeve 195 with a sleeve passage 196 in which a spool 197 is axially slidable for this purpose. This spool is attached to an actuating diaphragm 198 by a tie rod 199 which passes through a port 200 in the spool to be attached to its left-hand end. The tie rod passes through a ferrule 201 where the ferrule and the tie rod are opposed by a bias spring 202 that causes the tie rod to abut the diaphrabm and oppose pressure in a chamber 203. Chamber 203 receives pressure from a regulated air supply 205 (FIG. 8) which passes through a needle valve 206 which operates a fixed orifice ahead of chamber 203. It will now be seen that the pressure in chamber 203 will determine the axial position of the spool in selector valve 194. When the pressure drops in chamber 203, the spool will move to the right, and when it increases, it will move to the left against the force of the spring. Chamber 203 exhausts through a line 207 that in turn connects to nipple 170 and has as its sole point of exhaust signal orifice 175. Therefore, the signal orifice becomes the point of control of the pressure in chamber 203. This condition is shown in FIGS. 10, 11 nad 12 which represents three different positions of the signal orifice and surface 134. FIG. 10 shows these two spaced by a spacing "E" which will be considered the null condition. FIG. 11 shows them spaced by a distance "F" which is less than "E," and FIG. 12, a spacing "G" which is greater than "E."

Gauge 208 shows a constant reading which is the pressure delivered by the regulated air pressure supply. Gauge 209 shows different readings from figure to figure, this being the pressure in chamber 203 as changed by the signal pressure. As is evident from these drawings, at the null position there will be some intermediate pressure reading derived from the size of the gap between the signal port and surface 134. When the gap is closed, the pressure in chamber 203 will raise and when the gap is open as in FIG. 12, the pressure will decrease because of greater flow. These pressures are in turn transmitted to the diaphragm so as to shift the spool of selector valve 194 and thus determine the direction and rate of speed of motor 188, thereby turning both the signal tube and the bias force means.

FIG. 13 schematically shows the desired motion and resultant effects in one plane, for example the plane including the X and Z axes. The cutter is shown relative to a workpiece 210, and the stylus relative to a template 211. The pivot point notation 180 is also shown as is schematically illustrated the mounting means for X axis tracer valve 51. Also, the rate ring 133 is shown together with ball-like member 127. Notation 212 is a top view looking down on the rate ring, a notation 213 is a top view of the cutter. Arrow notation 214 indicates the bias force needed to move the stylus in the component to shift it to cause the template to approach the stylus and the workpiece to approach the cutter. As can be seen, the stylus tilts around pivot 180 and causes the ports of the tracer valve to shift by a distance indicated by notations 215. The extent of this pivoting is limited by contact between ball-like member 127 and surface 134.

The motion derived from the tracer valve adjustment will cause the table to shift to the right until the template causes the stylus to return to its upright, centered position at which time the milling cutter will cut the workpiece to the correct dimension. This same action takes place along all three of the axis and is the standard operation of a tracer valve control mechanism.

From the foregoing it will be seen that automatic operation of the device will be obtained by turning the bias force so that the stylus will seek the template and then exerting a component force along it which will cause the stylus to trace around the edge. Such action is shown in FIGS. 14–16, wherein the same notations are carried over, namely notation 180 as the pivot point of the stylus, notation 216 as the contact point of the stylus with the template, 127 as the upper ball-like member, and 134 as the internal surface of the rate ring. Arrow 141 again illustrates the direction of bias force, and arrow 217 indicates the resultant direction of table motion.

In FIG. 14, it is desired to seek the template, and the bias force is disposed at 45° to the stylus which tends to open both the X and Y valves and moves the table and workpiece in the direction relative to pivot point 180 as shown by arrow 217. When the template strikes the stylus and restores it to its normal position, then the bias force will tend to move the stylus only along the Y axis, as it cannot force it into the template. In this case, it will be seen that valve 51 is closed, while valve 52 remains open, and the tracer moves along the template on the Y axis in FIG. 15, the table moving in the direction shown by arrow 218 to cause this relative motion.

FIG. 16 illustrates the range of angular position of application of bias which is generally considered safe and effective in the operation of this device, which generally extends between 30° and 60° from the normal to the surface being traced. FIG. 17 indicates what occurs when the device comes to an outside corner. In this case, it is necessary for the bias force to shift and move counter-clockwise so that the bias force is again exerted at about 45° to the normal of the surface being traced, and again both the X and Y tracer valves are open. It will readily be seen that this tracing action can go on around the full periphery of the template, and this is shown in FIG. 18 where the bias force is indicated by arrows 141 as applied to stylus 48.

A more complete exposition which indicates in enlarged detail the relaitve positions of the stylus, bias force and the gap at the signal orifice is shown in FIGS. 19 through 22A. Again, surface 134 is shown as a circle, the signal orifice 175 is shown exhausting to it, pivot point 180 is the position of ball-like member 125, and circle 216 is the tip of the stylus. These notations are used through FIGS. 19–22A and the numbers will not be repeated. FIG. 19 shows the situation when tracing along a straight template where the bias force 141 is exerted at 45° to the surface along which the tracing is occurring. Then, as can be seen in FIG. 19A, there is a gap which is defined as a null gap between signal orifice 175 and surface 134. Next in FIG. 20, there is shown the tracing around the outside corner where initially the corner is reached, and it will be seen that suddenly the stylus faces a 15° corner, and is now disposed at only 30° relative to the surface being traced. This will have made the gap smaller as shown in FIG. 20A and will have increased the pressure in chamber 203. As a result, motor 188 will have turned both the bias force means and sleeve 164 so as to restore the relative positions of the bias force means and the signal orifice to thoe shown in FIG. 19, except rotated 15°. This condition is shown in FIG. 21, and again the 45° relationship is restored.

FIG. 22 indicates what occurs in tracing an inside corner, because then the angle of bias is too large. For example, assuming a 15° inside corner, the stylus now suddenly is at 60° to the surface being traced, and this will enlarge the gap as shown in FIG. 22A, thereby dropping the signal pressure, causing the selector valve to operate to reverse the motor 188, and restore the relative positions of the signal orifice and the surface 134 to that shown in FIGS 19 and 19A, only rotated 15° clockwise. From the foregoing, it will be evident that the device can now trace automatically inside and outside corners and will tend to maintain its null position.

FIGS. 23–25 illustrate a modification of the basic rate control portion characterized in FIGS. 1–22 by rate ring 133 and inner surface 134. In the first embodiment (see FIG. 5) surface 134 is fixed, not only as to diameter, but also as to its lateral excursion. Therefore once the diameter of surface 134 is selected, it acts as an unadjustable upper limit on the deflection of the stylus tip. This is very satisfactory for many installations. However, for others it is sometimes preferable to have available, without disassembling the valve and replacing ring 133 with one having a different inner diameter, the capacity for higher rates, i.e., greater stylus deflection, while still retaining the function of automatic control if such is desired. The embodiment of FIGS. 23–25 provides this capacity.

The upper end of stylus tube 48 is visible in FIGS. 23 and 24, as is the lower end of signal tube 168. There is no difference in their mounting from the other embodiments, and the valves and their controls are also alike. What is changed is ring 133. Instead of a ring which is fixed in the body, a ring 250 (see FIG. 25) is provided which has a cylindrical inner surface 251, sized in accordance with the criteria used to size surface 134, a peripheral frusto-conical surface 252, and a bounding annulus 253 with planar top and bottom surfaces 254, 255, respectively. A skirt 256 depends below annulus 255.

The body is modified to include a neck member 257 having threads 258 to which a retainer 259 may be threaded. The retainer includes an inwardly projecting flange 260. A spacer 261 is clamped to the neck member by the retainer, and this establishes the thickness of a channel 262 which receives the annulus. When ring 250 is centered, there is an annular clearance 263 between a cylindrical inner wall on the spacer and the circular outer wall 264 of the annulus. The annulus is loosely trapped so that the ring can slide around laterally in the channel. Evidently this sliding movement can be caused by bearing of the second ball-like member 127 against ring 250. Thus, if the ring 250 is constrained to a central position the maximum stylus deflection would be defined by surface 251, which would then be fixed in the same sense as surface 134. However, if ring 250 were free to shift laterally, then the possible deflection would be greater and would be defined by the limitation on the lateral shift.

Means 270 is provided to adjustably limit the lateral excursion of ring 250. This means includes an axially slidable sleeve 271 which fits inside neck member 257. A frusto-conical surface 272 on the lower end of the sleeve matches surface 252 on the ring. Now when the sleeve is down onto the ring as shown in FIG. 23, the frusto-conical surfaces engage each other, and the device operates as in the other embodiments, the surface 251 being fixed.

If, however, the sleeve is raised off the ring, then a tapered clearance 273 is created, and ring 250 can move laterally until the frusto-conical surfaces engage each other. This means that the stylus can deflect more, and that there is a higher rate of flow through the valve. Thus a new range of flows is made possible. If the sleeve is adjustably raised, the width of clearance 273 is adjustable, and this provides an adjustable range of higher flows. The controls as respects signal orifice 175 remains the same—it is the clearance between surface 251 and the orifice which exerts the control. When ring 250 can move laterally, this lateral motion is caused by force of ball-like member 127 against surface 251, a force which is derived from forces on the stylus tip.

Adjustment of the sleeve position is accomplished by forming a thread 274 on the sleeve, pinning the sleeve against rotation with a pin 275 between the sleeve and the neck member (the sleeve being slidable relative to the pin) and a jack screw 276 threaded to the sleeve. The jack screw is rotatable in the body, but cannot move vertically. A handle 277 is fixed to the jack screw and can be moved around the axis in a horizontal slot 278 in the body to turn the jack screw. Retractable means 279 is provided to hold the handle in a selected position.

It will now be seen that moving the handle will turn the jack screw and raise or lower the sleeve to adjust the lateral freedom of ring 250, and thereby the maximum deflection of the stylus and the rate of flow through the valves. The automatic control operates the same as before. Thus, the automatic control is exerted by reaction between the signal orifice and a cylindrical surface surrounding it, and the cylindrical surface may itself have the capacity to change its lateral location.

The operation of this device should be evident from the foregoing. The rate may be controlled either by removal and replacement of the rate ring with different sizes of cylindrical surfaces 134 to adjust the clearance between it and the signal orifice, or may be adjusted by means of the adjustment train shown when using the notched spool valves, or may be more readily adjustable by the means of FIGS 23–25. Similarly, the device is adaptable to manual 3D and 360 work to automatic 360 work simply by actuating the control system shown in detail in FIG. 8. The device is fully compatible with all classes of tracer-controlled machinery and its use will be readily understood by persons familiar with the tracer machinery art.

I claim:

1. A tracer assembly having an axis comprising: a body; three control elements which are orthogonally related, one of these being axially oriented, and the others normal to the axis, each of said control elements comprising a sleeve having a cylindrical spool passage and a spool making a fluid sealing, slidable and rotational fit therein, the sleeves and spools including grooves for controlling fluid flow through the control element as a function of spool position in the sleeve; at least two pairs of spool and sleeve grooves which are adjacent to each other having a notch extending axially therefrom in the two control elements which are normal to the axis, said notches extending toward each other; and means for simultaneously rotating the spools which carry the notches so as to vary the amount of rotational alignment of the notches of the respective pairs; a stylus extending parallel to said axis including a portion which projects beyond the body and is adapted to contact a template; mounting means spaced from said portion mounting the stylus so said portion is deflectible in any direction lateral to its longitudinal axis, said mounting means being mounted to a first one of said control elements so as to impart axial components of motion thereto; yoke means spaced from said mounting means joining the stylus to the remaining control elements so as to impart lateral components of motion thereto; bias force means mounted to the body and engaging the stylus at a point spaced from the mounting means so as to deflect the stylus; drive means for rotating the bias force means around the stylus; a rotatable signal tube having a signal orifice; a surface mounted to the body and surrounding the signal tube at the orifice, which surface has lateral dimensions greater than those of the signal tube at the signal orifice; transmission means joining the bias force means and signal tube for mutual rotation, an end of the signal tube and an end of the stylus being joined; and signal-responsive means responsive to the spacing of the signal orifice from the surface and adapted to control the drive means, whereby the angular position of the bias force means relative to the stylus is adjustable as a function of stylus deflection.

2. A tracer assembly according to claim 1 in which one end of said signal tube is rotatably mounted to the body, and the other end is mounted to the stylus, and in which at least one flexible section is provided in said signal tube to enable it to deflect and to change length to accommodate the movements of the stylus.

3. A tracer assembly according to claim 1 in which the signal-responsive means comprises a pressure-regulated air source, a fixed orifice receiving air from the source, a variable orifice comprising the aforesaid signal orifice and opposed surface receiving air from the fixed orifice, and a pressure-responsive four-way valve receiving air from the region between the two orifices to control application of power to the drive means.

4. A tracer assembly according to claim 1 in which the stylus includes a circular member within the surface opposite the signal orifice of smaller lateral dimension than said surface, said circular member being adapted to engage said surface to limit the maximum deflection of the stylus.

5. A tracer assembly according to claim 4 in which a ring is mounted to the body surrounding the circular member, which ring includes said surface, and which ring is restrained against axial movement, but adapted for limited lateral movement, said ring including a limiting surface extending around said axis, and in which assembly there is provided an axially-movable sleeve surrounding said axis and having a tapered surface adapted to engage and be withdrawn from the limiting surface on the ring, and in which means is provided for axially shifting the sleeve, whereby the ring may be held centered on the axis to limit the deflection of the stylus to a given amount, or may be permitted to shift laterally to enlarge the permissible stylus deflection.

6. A tracer assembly comprising: a body; two control elements, each of said control elements having an axis of control, said axes being perpendicular to each other, each of said control elements comprising a sleeve having a cylindrical spool passage and a spool making a fluid sealing, slidable and rotational fit therein, the sleeves and spools including grooves for controlling fluid flow through the control element as a function of spool position in the sleeve, at least two pairs of spool and sleeve grooves which are adjacent to each other having a notch extending axially therefrom, said notches extending toward each other; and means for simultaneously rotating the spools in two of said control elements to vary the amount of rotational alignment of the notches of the respective pairs; a stylus having a longitudinal axis including a portion which projects beyond the body and is adapted to contact a template; mounting means spaced from said portion mounting the stylus to the body so said portion is deflectible in any direction lateral to its longitudinal axis; yoke means spaced from said mounting means joining the stylus to the control elements so as to impart lateral components of motion thereto; bias force means mounted to the body and engaging the stylus at a point spaced from the mounting means so as to deflect the stylus; drive means for rotating the bias force means around the stylus; a rotatable signal tube having a signal orifice; a surface mounted to the body and surrounding the signal tube at the orifice, which surface has lateral dimensions greater than those of the signal tube at the signal orifice; transmission means joining the bias force means and signal tube for mutual rotation, an end of the signal tube and an end of the stylus being joined; and signal-responsive means responsive to the spacing of the signal orifice from the surface and adapted to control the drive means, whereby the angular position of the bias force means relative to the stylus is adjustable as a function of stylus deflection.

7. A tracer assembly according to claim 6 in which one end of said signal tube is rotatably mounted to said body, and the other end is mounted to the stylus, and in which at least one flexible section is provided in said signal tube to enable it to deflect to accommodate the movements of the stylus.

8. A tracer assembly according to claim 6 in which the signal-responsive means comprises a pressure-regulated air source, a fixed orifice receiving air from the source, a variable orifice comprising the aforesaid signal orifice and opposed surface receiving air from the fixed orifice, and a pressure-responsive four-way valve receiving air from the region between the two orifices to control application of power to the drive means.

9. A tracer assembly according to claim 6 in which the stylus includes a circular member within the surface opposite the signal orifice of smaller lateral dimension than said surface, said circular member being adapted to engage said surface to limit the maximum deflection of the stylus.

10. A tracer assembly according to claim 9 in which a ring is mounted to the body surrounding the circular member, which ring includes said surface, and which ring is restrained against axial movement, but adapted for limited lateral movement, said ring including a limiting surface extending around said axis, and in which assembly there is provided an axially-movable sleeve surrounding said axis and having a tapered surface adapted to engage and be withdrawn from the limiting surface on the ring, and in which means is provided for axially shifting the sleeve, whereby the ring may be held centered on the axis to limit the deflection of the stylus to a given amount, or may be permitted to shift laterally to enlarge the permissible stylus deflection.

11. A tracer assembly comprising: a body; two control elements, each of said control elements having an axis of control, said axes being perpendicular to each other, each of said control elements comprising a sleeve having a cylindrical spool passage and a spool making a fluid sealing slidable and rotational fit therein, the sleeves and spools including grooves for controlling fluid flow through the control element as a function of spool position in the sleeve, at least two pairs of spool and sleeve grooves which are adjacent to each other having a notch extending axially therefrom, said notches extending toward each other; and means for simultaneously rotating the spools in two of said control elements to vary the amount of rotational alignment of the notches of the respective pairs; a stylus having a longitudinal axis including a portion which projects beyond the body and is adapted to contact a template; mounting means spaced from said portion mounting the stylus to the body so said portion is deflectible in any direction lateral to its longitudinal axis; and yoke means spaced from said mounting means joining the stylus to the control elements so as to impart lateral components of motion thereto.

12. A tracer assembly according to claim 11 in which the means for simultaneously rotating the spools comprises a drive-linkage including a gear for each spool having teeth extending axially of said spool, and matching teeth on the spool engaging the said gear.

13. A tracer assembly having an axis comprising: a body; three control elements which are orthogonally related, one of these being axially oriented, and the others normal to the axis, each of said control elements comprising a sleeve having a cylindrical spool passage and a spool making a fluid sealing, slidable and rotational fit therein, the sleeves and spools including grooves for controlling fluid flow through the control element as a function of spool position in the sleeve, at least two pairs of spool and sleeve grooves which are adjacent to each other having a notch extending axially therefrom in the two control elements which are normal to the axis, said notches extending toward each other; and means for simultaneously rotating the spools which carry the notches so as to vary the amount of rotational alignment of the notches of the respective pairs; a stylus extending parallel to said axis including a portion which projects beyond the body and is adapted to contact a template; mounting means spaced from said portion mounting the stylus so said portion is deflectible in any direction lateral to its longitudinal axis, said mounting means being mounted to a first one of said control elements so as to impart longitudinal components of motion thereto; and yoke means spaced from said mounting means joining the stylus to the remaining control elements so as to impart lateral components of motion thereto.

14. A tracer assembly according to claim 11 in which the means for simultaneously rotating the spools comprises a drive-linkage including a gear for each spool having teeth extending axially of said spool, and matching teeth on the spool engaging the said gear.

15. A tracer assembly having an axis comprising: a body; two control elements which are perpendicular to each other and to the axis, each of said control elements comprising a sleeve having a cylindrical spool passage and a spool making a fluid sealing, slidable fit therein, the sleeves and spools including grooves for controlling fluid flow through the control element as a function of spool position in the sleeve; a stylus having a longitudinal axis including a portion which projects beyond the body and is adapted to contact a template; mounting means spaced from said portion mounting the stylus to the body so said portion is deflectible in any direction lateral to its longitudinal axis; yoke means spaced from said mounting means joining the stylus to the control elements so as to impart lateral components of motion thereto; bias force means mounted to the body and engaging the stylus at a point spaced from the mounting means so as to deflect the stylus; drive means for rotating the bias force means around the stylus; a rotatable signal tube having a signal orifice; a surface mounted to the body and surrounding the signal tube at the orifice, which surface has lateral dimensions greater than those of the signal tube at the signal orifice; transmission means joining the bias force means and signal tube for mutual rotation, an end of the signal tube and an end of the stylus being joined; and signal-responsive means responsive to the spacing of the signal orifice from the surface and adapted to control the drive means, whereby the angular position of the bias force means relative to the stylus is adjustable as a function of stylus deflection.

16. A tracer assembly according to claim 15 in which one end of said signal tube is rotatably mounted to said body, and the other end is mounted to the stylus, and in which at least one flexible section is provided in said signal tube to enable it to deflect to accommodate the movements of the stylus.

17. A tracer assembly according to claim 15 in which the stylus includes a circular member within the surface opposite the signal orifice of smaller lateral dimension than said surface, said circular member being adapted to engage said surface to limit the maximum deflection of the stylus.

18. A tracer assembly according to claim 17 in which a ring is mounted to the body surrounding the circular member, which ring includes said surface, and which ring is restrained against axial movement, but adapted for limited lateral movement, said ring including a limiting surface extending around said axis, and in which assembly there is provided an axially-movable sleeve surrounding said axis and having a tapered surface adapted to engage and be withdrawn from the limiting surface on the ring, and in which means is provided for axially shifting the sleeve, whereby the ring may be held centered on the axis to limit the deflection of the stylus to a given amount, or may be permitted to shift laterally to enlarge the permissible stylus deflection.

19. A tracer assembly having an axis comprising: a body; three control elements which are orthogonally related, one of which is axially oriented, each of said control elements comprising a sleeve having a cylindrical spool passage and a spool making a fluid sealing, slidable fit therein, the sleeves and spools including grooves for controlling fluid flow through the control element as a function of spool position in the sleeve; a stylus having a longitudinal axis including a portion which projects beyond the body and is adatped to contact a template; mounting means spaced from said portion mounting the stylus so said portion is deflectible in any direction lateral to its longitudinal axis, said mounting means being mounted to a first one of said control elements so as to impart longitudinal components of motion thereto; yoke means spaced from said mounting means joining the stylus to the remaining control elements so as to impart lateral components of motion thereto; bias force means mounted to the body and engaging the stylus at a point spaced from the mounting means so as to deflect the stylus; drive means for rotating the bias force means around the stylus; a rotatable signal tube having a signal orifice; a surface mounted to the body and surrounding the signal tube at the orifice and having lateral dimensions greater than those of the signal tube at the signal orifice; transmission means joining the bias force means and signal tube for mutual rotation, an end of the signal tube and an end of the stylus being joined; and signal-responsive means responsive to the spacing of the signal orifice from the surface and adapted to control the drive means, whereby the angular position of the bias force means relative to the stylus is adjustable as a function of stylus deflection.

20. A tracer assembly according to claim 19 in which one end of said signal tube is rotatably mounted to the body, and the other end is mounted to the stylus, and in which at least one flexible section is provided in said signal tube to enable it to deflect and to change length to accommodate the movements of the stylus.

21. A tracer assembly according to claim 19 in which the stylus includes a circular member within the surface opposite the signal orifice of smaller lateral dimension than said surface, said circular member being adapted to engage said surface to limit the maximum deflection of the stylus.

22. A tracer assembly according to claim 21 in which a ring is mounted to the body surrounding the circular member, which ring includes said surface, and which ring is restrained against axial movement, but adapted for limited lateral movement, said ring including a limiting surface extending around said axis, and in which assembly there is provided an axially-movable sleeve surrounding said axis and having a tapered surface adapted to engage and be withdrawn from the limiting surface on the ring, and in which means is provided for axially shifting the sleeve, whereby the ring may be held centered on the axis to limit the deflection of the stylus to a given amount, or may be permitted to shift laterally to enlarge the permissible stylus deflection.

References Cited
UNITED STATES PATENTS

| | | | |
|---|---|---|---|
| 2,909,357 | 10/1959 | Rosebrook | 251—3 |
| 2,971,535 | 2/1961 | Weaver | 137—625.17 |
| 3,006,595 | 10/1961 | Rosebrook | 251—3 |
| 3,023,778 | 3/1962 | Hayes et al. | 251—3 XR |
| 3,114,295 | 12/1963 | Ronner et al. | 251—3 XR |
| 3,262,370 | 7/1966 | Magor | 90—62 XR |

CLARENCE R. GORDON, Primary Examiner

RICHARD GERARD, Assistant Examiner

U.S. Cl. X.R.

60—97; 91—37, 413; 137—625

PO-1050
(5/69)

UNITED STATES PATENT OFFICE
CERTIFICATE OF CORRECTION

Patent No. 3,459,402                    Dated   August 5, 1969

Inventor(s)    Paul J. Weaver

It is certified that error appears in the above-identified patent and that said Letters Patent are hereby corrected as shown below:

Column 8, line 56, "nad" should be --and--

Column 9, line 9, "a" should be --and--

Column 9, line 23, "axis" should be --axes--

Column 11, line 36, "," should be --.--

Column 11, line 43, after "work" and before "to" insert --and--

SIGNED AND
SEALED
JUL 14 1970

(SEAL)
Attest:

Edward M. Fletcher, Jr.
Attesting Officer

WILLIAM E. SCHUYLER, JR.
Commissioner of Patents